US006539386B1

(12) United States Patent
Athavale et al.

(10) Patent No.: US 6,539,386 B1
(45) Date of Patent: Mar. 25, 2003

(54) METHODS AND APPARATUS FOR MODIFYING A CUSTOMER ORDER

(75) Inventors: Atul G. Athavale, Sunnyvale, CA (US); David M. Joffe, Mountain View, CA (US); Subramanian Srinivasan, Fremont, CA (US); Anh-Thu T. Tran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 09/594,429

(22) Filed: Jun. 15, 2000

(51) Int. Cl.[7] .............................................. G06F 17/30
(52) U.S. Cl. ...................................... 707/10; 707/104.1
(58) Field of Search ........................... 707/10, 3, 104.1

(56) References Cited

U.S. PATENT DOCUMENTS

| | | | | |
|---|---|---|---|---|
| 4,799,156 A | * | 1/1989 | Shavit et al. ................. 705/26 |
| 5,666,493 A | * | 9/1997 | Wojcik et al. ................ 705/22 |
| 5,758,329 A | * | 5/1998 | Wojcik et al. ................ 705/28 |
| 6,016,504 A | | 1/2000 | Arnold et al. ............... 709/200 |
| 6,067,525 A | | 5/2000 | Johnson et al. .............. 705/10 |

* cited by examiner

Primary Examiner—Diane D. Mizrahi
(74) Attorney, Agent, or Firm—Chapin & Huang, L.L.C.; David E. Huang, Esq.

(57) ABSTRACT

The mechanism is directed to techniques for automatically handling a change order request that modifies an order previously submitted by a customer to a manufacturer and/or distributor of products. A change order system includes a change order engine implemented on a network commerce server, an order entry application implemented on an order database server, and an ordering application implemented on a customer computer or an ordering server The change order system provides for the automatic handling over an electronic network of a change order request from a customer, while providing a current status of the order and feedback to the customer. The customer enters a change order request to the ordering application, which forwards the change order request over the Internet to the change order engine. The change order engine directs the order entry application to place a hold on the current order and send an update of the current order status back to the customer, as well as other feedback on any adverse impacts of the proposed changes. The customer then confirms the change order request if still wishing to pursue it. The change order engine removes the hold on the order and allows the fulfilling of the order by the appropriate manufacturing and distribution facilities.

35 Claims, 7 Drawing Sheets

METHODS AND APPARATUS FOR MODIFYING A CUSTOMER ORDER

BACKGROUND OF THE INVENTION

Historically, customers of a company have entered orders for products and/or services by calling a sales representative or submitting a written order to the company. If the customer later desires to change the order that was already submitted, then the customer has to call the company or submit a new written order. With the advent of electronic data processing the ordering process has become computerized, and a customer can enter an order onto the screen of a computer and then send the order to a company electronically, such as over a computer network. Many companies have developed ordering systems with complex electronic forms and systems to handle orders submitted by customers.

The ordering systems route the completed orders to the appropriate manufacturing and/or distribution facility within the company to fulfill the order. Often orders are fulfilled with a speed that would not have been possible in the precomputer age. If the customer desired to change the electronically submitted order, often the customer would have to call the sales representative or cancel the previous order and submit a new order electronically.

Modem ordering systems can handle complex orders for systems of assembled parts. For example, a customer may order a computer system from a computer manufacturer. Suppose that the customer requests in the order that the computer system be configured for a particular processor, a certain amount of RAM memory, a particular hard disk size, and other features selected by the customer. The order may be based on an ATO (assemble to order) approach, meaning that the ordered item is assembled based on each individual order after the order has been received. In the example of the computer system, the manufacturer receives this order, places it in a queue for manufacturing, assembles the computer system to the specifications requested by the customer, and then ships it to the customer. The manufacturing process is primarily a process of assembling the selected parts and modules into a complete unit, loading the appropriate software, and testing the finished product. Accordingly, manufacturers can now handle complex orders for different configurations and options for systems that are custom configured and assembled for each individual order

SUMMARY OF THE INVENTION

When a customer seeks to update or modify an order that was previously submitted, customer may not be aware of the latest status of the order. The customer may have a copy of the order that was previously submitted, but he/she does not readily know where the order is in the company's ordering system. The customer may submit a modification to the order changing the configuration of an ordered piece of equipment. However, the order may be at a stage where it is currently being fulfilled at a manufacturing or assembly facility, where the requested equipment is in the process of being assembled based on the configuration originally requested. The customer may think the change order request has been applied to the order to change the configuration that was originally suggested, but the assembly process may be completed before the modification moves through the ordering system to match up with the order at the manufacturing facility.

Thus, the equipment ordered by the customer is assembled based on the original order, while the customer is expecting the equipment to be configured based on the modified order. The customer may receive the assembled equipment and discover that it does not meet expectations, because the order was never updated with the new modifications. Alternatively, the modified order is routed to and matched up with the current order, while the equipment is being assembled. The facility assembling the equipment must halt the process, perhaps disassemble all or part of the unit, and reassemble it according to the modified order. The awkward question arises of who should pay for the reassembly, the customer or the company. The customer may receive an unexpected surcharge. The customer may wish to have the option of receiving the originally ordered equipment without a surcharge, rather than receive the modified equipment with a surcharge.

Another problem related to timing arises when the company has not begun assembly of the ordered equipment, when it receives the modified order. When the customer placed the original order, the customer secured a shipment date based on the order date. If the customer modifies the order, the customer then may lose the original ship date. The customer may wish to know that the ship date has been changed, before confirming to go ahead with the modified order. In some situations, the ship date may be more critical to the customer than some relatively minor change in the configuration, and the customer may wish to have the option of retaining the original shipment date without any modification to the order.

Of course, these types of problems can often be resolved by a phone conversation or other direct communication with a sales representative. Generally, the customer prefers to order over a computer network, such as the Internet, at the customer's convenience, without playing "phone tag" when trying to connect with an individual by telephone or experiencing other problems in verbal communication. Likewise, the customer typically prefers to retain the electronic ordering approach when requesting a change to an order. The customer also may desire to know what stage the order is in and also any critical impacts of modifying the order, such as loss of the ship date, surcharges for reassembly of a piece of equipment, unexpected increase in price due to a change in subcomponents in the configuration, and other issues. Preferably, the customer wishes to know these impacts without the burden of direct phone calls or other direct contact with sales representatives.

An additional problem is that the current order may have been modified one or more times before the customer decides to modify it again. This may occur in a variety of ways. The customer may decide that the order needs additional modification due to changing circumstances. The customer may work in a large department where someone else in the department modified the order without timely communicating the change. The customer thus wishes to be aware of the latest modifications to the order and the order's current configuration before making any additional modifications, which could, in fact, turn out to be unnecessary.

The present invention substantially overcomes the above deficiencies of typical electronic ordering systems. One object of the invention is to provide, on demand, the current status of the order to the customer. The customer can thus view the latest version of the order and also determine basic status issues, such as whether the order is already fulfilled or in the midst of the process of being fulfilled. In different embodiments of the invention, the customer can access an ordering application on the customer's local computer, or the customer can use the local computer to access the ordering application on an ordering server over a network.

Another object of the invention is to place a hold on the current order, when the customer initiates the query about the order with the intention of changing it. Thus, the customer avoids the problem of the current order beginning fulfillment, such as assembly of a piece of equipment, while the customer is considering and preparing the changes to the order.

A further object of the invention is to provide feedback on adverse impacts of any modifications that the customer wishes to make, such as changes leading to loss of the ship date. The customer receives the feedback, considers it, and then makes an informed decision as to whether to proceed with the change order request. If the customer wishes to proceed, the customer confirms the change order request.

A general object of the invention is to provide an automated ordering and feedback process that minimizes any direct contact with other individuals, such as sales representatives. A further object is to allow for special conditions and exceptional situations, if the processing and feedback for the change order request cannot be handled automatically. In other words, the change to the order preferably should not be fulfilled at all costs or in any circumstances if particular problems arise, such as incurring higher costs to the company.

In one aspect, the invention is a method for modifying, over a network, a current order based on a previously submitted customer order, including receiving a change order request; placing a hold on the current order; providing a current order status; providing a confirmation of the change order request; modifying the current order based on the change order request to provide a modified order; and releasing the hold to enable fulfilling of the modified order. Thus the customer placing the change order request is able to confirm the change order request based on receiving a current order status.

In one embodiment, the method further includes applying one or more additional change order requests to the modified order to provide a plurality of versions of modified orders and maintaining the plurality of versions of modified orders. The customer and others are able to track multiple versions of an order that may be modified one or more times.

In another embodiment, the method further includes providing feedback that indicates changes to the current order and allowing modification to the change order request based on the feedback before confirming the change order request. The customer is thus able to receive feedback about the changes being proposed and make additional changes if so desired.

In a further embodiment, the method includes evaluating a validity of the change order request. In another embodiment, the method includes providing a completion signal that indicates the completion of the modification of the current order based on the change order request.

Another aspect of the invention is directed to a system for modifying, over a network, a current order based on a previously submitted customer order. The system includes a customer computer, a network commerce computer, and an order database server. The customer computer includes an ordering application capable of generating a change order request. The network commerce server includes a change order engine. The order database server includes an order database and an order entry application that is capable of accessing and updating the order database. The ordering application generates a change order request and submits the change order request over the network to the change order engine. The change order engine requests the order entry application to place a hold on the current order status and to provide a current order status to the ordering application. The ordering application provides confirmation of the change order request to the change order engine. The change order engine instructs the order entry application to modify the current order in the order database based on the change order request to provide a modified order and to release the hold so that the modified order is capable of being fulfilled.

In one embodiment, the ordering application provides one or more additional change order requests to the change order engine to provide a plurality of versions of modified orders and the order entry application maintains the plurality of versions of modified orders. In another embodiment, the order entry application provides feedback indicating changes to the current order to the ordering application, and the ordering application allows modification to the change order request and provides the modified change order request to the change order engine. Thus, the system of the invention provides for the customer to receive the current status of the order, as well as feedback on the order, and to confirm the change order request.

In one embodiment, the change order engine evaluates the validity of the change order request. In a further embodiment, the order entry application provides a completion signal to the ordering application that indicates that the order entry application has applied the change order request to the order database.

In another aspect of the invention, an apparatus receives, over a network, a change order request to a current order based on a previously submitted customer order. The apparatus includes a network commerce server and an order database server. The network commerce server includes a change order engine that receives the change order request over the network. The order database includes an order database and an order entry application that is capable of accessing and updating the order database. The change order engine places a hold on the current order and requests the order entry application to determine a current order status of the current order and to provide the current order status over the network. The change order engine receives a confirmation of the change order over the network and submits the change order request to the order entry application to modify the current order in the order database to provide a modified order. The change order engine removes the hold to enable fulfilling the modified order.

In another embodiment, the apparatus further includes an exceptions module that is capable of handling exceptional situations requiring special handling of the change order request. The change order engine determines that the change order request requires special handling, provides the change order request to the exceptions module, and the exceptions module provides the change order request to the order entry application for entry into the order database. Thus special situations are directed to a customer representative without an explicit request from the customer placing the change order request.

In another embodiment, the change order engine further includes an evaluator that evaluates the validity of the change order request. In an additional embodiment, the change order engine receives a modification to the change order request over the network after providing the current order status over the network.

In another aspect, the apparatus includes a customer computer for submitting, over a network, a change order request to a current order based on a previously submitted customer order. The apparatus includes an ordering application executing on the customer computer that displays an order status on a customer computer and is capable of receiving input from the customer and a refresh module executing on the customer computer capable of refreshing the order status. The ordering application places a hold on the current order in response to the input of the change order request. The refresh module refreshes the order status in response to the input of the change order request by the user. The ordering application confirms the change order request and submits the change order request over the network.

In another embodiment, the refresh module receives feedback over the network that indicates changes to the current order. The ordering application displays the feedback on the customer computer and allows modification to the change order request based on the feedback before submitting the change order request over the network. In a further embodiment, the apparatus further includes an evaluator that evaluates a validity of the change order request.

In another aspect, the invention is directed to a method for submitting, over a network, a change order request to a current order based on a previously submitted customer order. The method includes receiving the change order request; transmitting the change order request over the network; requesting a hold on the current order; receiving a current order status over the network; providing a confirmation of the change order request; transmitting the confirmation of the change order request over the network; and receiving a completion signal over the network indicating that the current order has been modified. Accordingly, the customer is able to provide confirmation of the change order request based on the current status of the order and also receive an indication that the change order request has been applied to the current order.

A further embodiment of the invention is directed to a computer program product that includes a computer readable medium having instructions stored thereon for modifying a current order over a network based on a previously submitted customer order. The instructions, when carried out by the computer, cause the computer to receive the change order request; transmit the change order request over the network; request a hold on the current order; receive a current order status over the network; provide a confirmation of the change order request; transmit the confirmation of the change order request over the network; and receive a completion signal over the network indicating that the current order has been modified.

Another embodiment of the invention is directed to a computer program propagated signal product embodied in a propagated medium, having instructions for modifying a current order over a network based on a previously submitted customer order. The instructions, when carried out by a computer, cause the computer to receive the change order request; transmit the change order request over the network; request a hold on the current order; receive a current order status over the network; provide a confirmation of the change order request; transmit the confirmation of the change order request over the network; and receive a completion signal over the network indicating that the current order has been modified.

In another aspect, the apparatus includes an ordering server for submitting, over a network, a change order request to a current order based on a previously submitted customer order. The apparatus includes an ordering application executing on the ordering server that provides an order status over the network and is capable of receiving over the network input specifying a change order request; and a refresh module executing on the ordering server that is capable of refreshing the order status. The ordering application places a hold on the current order in response to the input of the change order request. The refresh module refreshes the order status in response to the input of the change order request. The ordering application confirms the change order request and submits the change order request over the network.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention.

The features of the invention, as summarized above, may be employed in devices and software manufactured by Cisco Systems, Inc. of San Jose, Cali.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The invention is directed to techniques for the automatic handling of a change order request that requests a modification to a previously submitted customer order, such as for a product manufactured by a company. The customer enters a change order request at a customer computer, which forwards the change order request to a change order engine. The change order engine places a hold on the current order and requests that an update of the current order status and other feedback be provided to the customer. The customer then confirms the change order request. The change order engine then updates a database of orders, removes the hold on the order, and allows the order to be transmitted to a manufacturing and distribution facility for manufacturing, assembly, and distribution of the ordered equipment. The features of the invention may be employed in devices and software manufactured by Cisco Systems, Inc. of San Jose, Calif.

Figure 1:
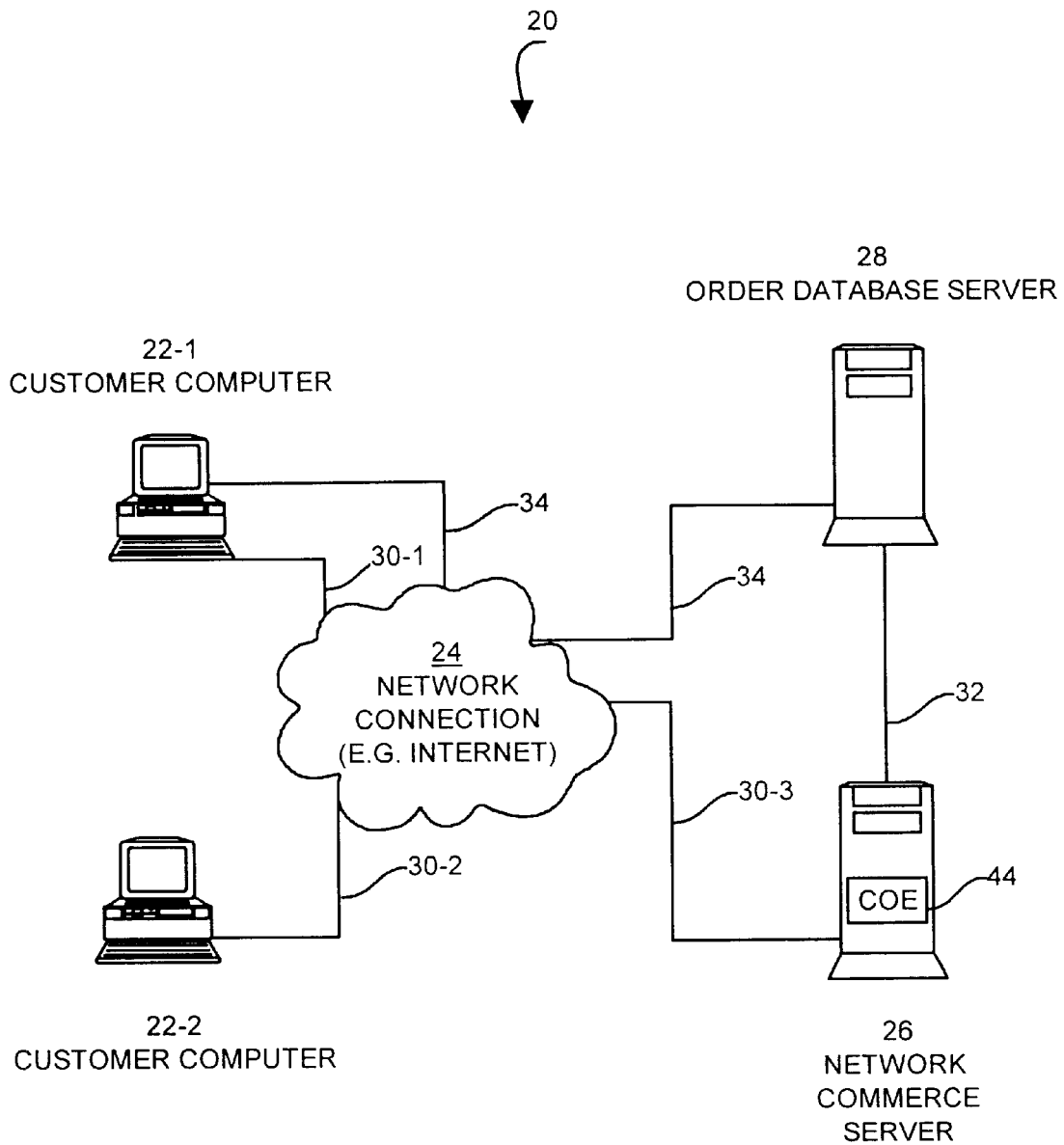
FIG. 1 shows a pictorial view of a change order system according to an embodiment of the invention including a customer computer, a network commerce server and an order database server.

FIG. 1 illustrates a change order system 20 including customer computers 22-1 and 22-2 (collectively customer computer 22) connected over a network 24 to a network commerce server 26 and an order database server 28. The network commerce server 26 includes a change order engine 44. A customer enters a request into one of the customer computers 22 to change a current order. That customer computer 22 provides a customer signal 30 (30-1 for the customer computer 22-1 and 30-2 for the customer computer 22-2) for modifying a current order and transmits it over the network to the change order engine 44 executing on the network commerce server 26. The change order engine 44 sends a change order request signal 32 to the order database server 28 that requests the order database server 28 to provide the status of the current order to the customer. The order database server 28 sends a feedback signal 34 to that customer computer 22-1. A feedback signal 34 may also be sent back to the other customer computer 22-2 (not shown).

The customer computers 22-1, 22-2 are computing systems including a processor, a memory, an output device, such as a visual display, an input device for the customer to provide input, and communication hardware that enable communication over the network connection 24. In alternate embodiments, the computer computers 22-1, 22-2 are desktop computers, laptop computers, palmtop computers, or other types of computers. The number of customer computers 22-1, 22-2 is not limited to two as shown in FIG. 1.

For one embodiment, the network connection 24 is a packet-based global network such as the Internet. In alternate embodiments, the network connection 24 is a local area network (LAN), such as an Ethernet, a wide area network (WAN), an enterprise wide intranet, a direct line connection, or other connection.

The network commerce server 26, in one embodiment, is a server computer including a processor, a memory, and communication hardware that enables communication over the network connection 24. The change order engine 44 is formed as a software application executing on the processor. That is, the instructions for this application are stored in memory and execute on the processor.

The order database server 28 is a server computer, including a processor, a memory, and communication hardware that enables communication over the network connection 24. In alternate embodiments, the network commerce server 26 and order database server 28 are PC server computers, UNIX server computers, a minicomputers, mainframe computers, or other type of suitable server computers, without any requirement that they be the same type of computer.

Figure 2:
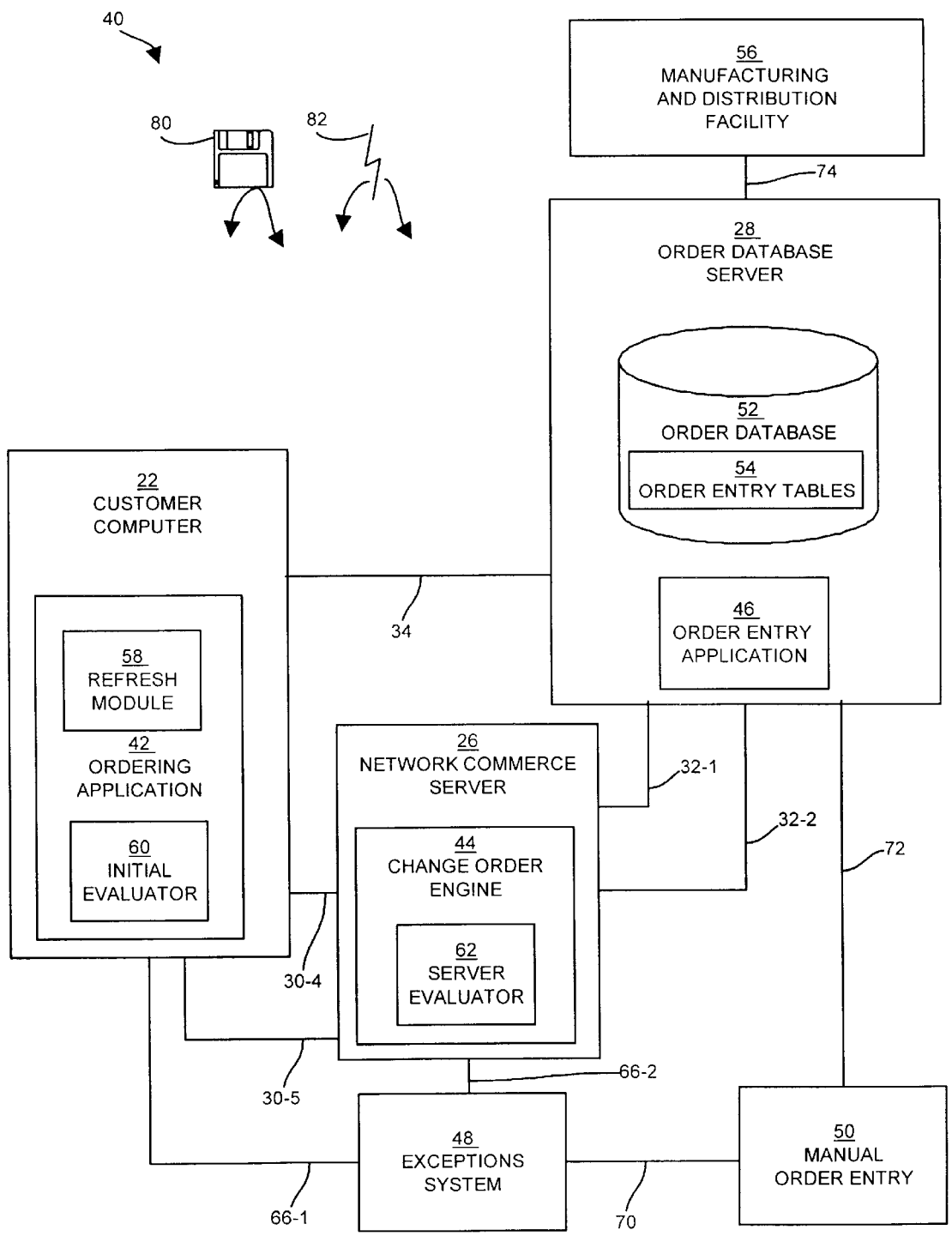
FIG. 2 shows, by way of example only, a block diagram of the system of FIG. 1, further including an ordering application, a change order engine, an order entry application, an order database, an exceptions system, a manual order entry system, and a manufacturing and distribution facility.

FIG. 2 shows, by way of example only, a change order system 40 as one instance of the change order system 20 shown in FIG. 1. The change order system 40 includes a customer computer 22, a network commerce server 26, an order database server 28, an exceptions system 48, a manual order entry system 50, and a manufacturing and distribution facility 56, for one embodiment of the invention. The customer computer 22 includes an ordering application 42 including a refresh module 58 and an initial evaluator module 60. The network commerce server 26 includes a change order engine 44 including a server evaluator module 62. The order database server 28 includes an order entry application 46 and an order database 52 including order entry tables 54.

In one version of the invention, the ordering application 42 is a software application, module, or applet, the instructions for which are stored in the memory and which execute on the processor of the customer computer 22. The refresh module 58 is a software module, application, or applet that updates the status of the current order being displayed to the customer on the customer computer 22, based on a feedback signal 34 provided to the customer computer 22 from the order database server 28. The feedback signal 34 provides the status of the current order based on a previously submitted order by the customer that is stored in the order database 52. In one embodiment, the evaluator 60 is a software module, application, or applet that provides authorization for the customer to make the proposed change to the order and evaluates the validity of the proposed change, that is, whether the customer has authorization to change that particular order and also whether the specific changes are allowable. In other embodiments, the refresh module 58 and evaluator 60 are not parts of the ordering application 42, but are separate software modules, applications, applets, routines, procedures, or scripts executing on the processor of the customer computer 22.

The initial evaluator 60 evaluates a proposed change input in a change order request by the customer to the customer computer 22. If the customer is authorized to make such a change and the change order request is valid, the initial evaluator 60 authorizes the ordering application 42 to transmit the change order request in a customer signal 30-4 transmitted to the network commerce server 26. If the evaluator 60 determines that the change order request is not valid, the ordering application 42 sends the change order request in an exceptions signal 66-1 to an exceptions system 48 (to be discussed later).

The change order engine 44 includes, in one embodiment, a server evaluator 62 that evaluates the validity of the change order request received in the customer signal 304 from the customer computer 22. If the change order request is valid, in one embodiment, the server evaluator 62 authorizes the change order engine 44 to transmit a refresh request in a change order request signal 32-1 transmitted to the order database server 28. If the server evaluator 62 determines that the change order request is not valid or requires special handling, the change order engine sends the change order request in an exceptions signal 66-2 to the exceptions system 48 (to be discussed later).

In one embodiment, the exceptions system 48 is a computer system including a software application, module, applet, script, or other software program that handles the exception signals 66-1 or 66-2 received from the customer computer 22 or the network commerce server 26. In one version, customer or sales representatives use the exceptions system 48 to evaluate the change order request and make appropriate modifications to the order. For example, if the customer expects a certain discount on the changed order that the customer is no longer entitled to receive due to the change in the order, then the customer representative may authorize the discount or contact the customer. The exceptions system 48 then transfers the change order request as an approved exceptions signal 70 to a manual order entry system 50. In one embodiment, the manual order entry system 50 is software application for manual order entry by the sales representative. For example, the manual order entry system 50 may be a graphics user interface that is part of the order database server 28. In this example, the manual order entry system 50 transmits the manually entered change order request to the order database server 28 as a manual order entry signal 72. In another embodiment, the manual order entry system 50 is a software application executing on a computer associated with the exceptions system 48 that receives the manual input of the sales representative and sends it to the order database server 28.

The order database server 28 includes an order database 52. The order database 52 is a database of orders that have been entered and are in a queue to be fulfilled. The order database 52 is implemented based on suitable database software using a suitable storage medium, such as one or more hard disks, as is known in the art. In one version, the order database 52 is based on database software available from Oracle® Corporation, Redwood Shores, California. In alternative embodiments, the storage medium is a tape drive, writeable CD-ROM or other suitable storage medium. In one version, the order database 52 includes order entry tables that store fields of data for each current order. In another embodiment, the order database 52 stores a plurality of versions of each order that has been entered and subsequently modified. The order database 52 allows recovery and tracking of the different versions of an order.

The order entry application 46 is a software application, module, applet, script, or other software program, the instructions for which are stored in the memory of the order database server 28 and execute on the processor of the order database server 28. The order entry application 46 receives the change order request signal 32 from the network commerce server 26 and provides a status for the current order that the customer is requesting a change to by sending a feedback signal 34 to the customer computer 22. In one version, the order entry application 46 also provides information on any adverse impacts that may be associated with the change order request if the request is completed. For example, the current order may be assigned a certain shipment date based on when the order was originally transmitted to the order database server 28. If the order is changed, then the order may lose its original shipment date and be assigned a new shipment date. In this example, the feedback signal 34 includes a proposed shipment date which is displayed to the customer by the customer computer 22. If the customer is satisfied with the proposed shipment date, the customer then confirms the change order request in a second customer signal 30-5 sent from the customer computer 22 to the network commerce server 26 (in this example, the first customer signal 30-4 was the first transmission of the customer's change order request to the network commerce server 26). The network commerce server 26 in turn sends a confirmation in the change order request signal 32-2 to the order database server 28, directing the order database server 28 to update the order entry tables 54 in the order database 52 with the modified customer order based on the change order request as confirmed by the customer. The order entry application 46, in one embodiment, is based on a modified order entry application from Oracle® Corporation, Redwood Shores, Calif.

In one version of the invention, the order database 52 is separate from the order database server 28 and is associated with its own computer system which is connected by direct line or network connection to the order database server 28 (not shown in FIG. 2). In another version, if the order database 52 is very large, then the order database server 28 is linked with many separate order databases 52, each of which may reside in a separate computer system.

The order database server 28 and network commerce server 26, in one embodiment, are combined into one server (not shown) with one or more processors that execute the change order engine 44 and the order entry application 46. In another embodiment, the change order engine 44 and the order entry application 46 are implemented as distributed software objects that execute on two, three, or more computer systems as a distributed software application, as is known in the art.

The manufacturing and distribution facility 56 is a facility that receives a queued order signal 74 embodying an approved order that is available to be fulfilled. The manufacturing and distribution facility 56 is described as a manufacturing facility for manufacturing or assembling hardware equipment, by way of example only, and the manufacturing and distribution facility 56 can be other types of facilities, such as a software distribution center for copying and distributing software products, a distribution center for distributing preassembled products, and/or a services center that provides consulting, professional, or other services. The term "fulfilled" means manufacturing of a new piece equipment, the assembly of a piece of equipment from modular parts, the distribution of already manufactured products, the manufacturing and distribution of software products, the provision of services, and any combination of the preceding. In one example, the manufacturing and distribution facility 56 receives a modified order that has been validated and approved by a customer in a queued order signal 74, which is stored in a storage medium at a computer system at the manufacturing and distribution facility 56. The facility 56 then proceeds to fulfill the order by providing the products and/or services requested in the order, and shipping or otherwise providing them to the customer based on the modified customer order.

In one embodiment, a computer program product 80 including a computer readable medium (e.g. one or more CDROM's, diskettes, tapes, etc.) provides software instructions for one or more of the software applications described above, including the ordering application 42, the change order engine 44, and the order entry application 46. The computer program product 80 can also provide software instructions for modules or parts of these applications 42, 44, 46, such as the refresh module 58, the initial evaluator 60, the server evaluator 62, and other parts of the applications 42, 44, 46.

The computer program product 80 can be installed by any suitable software installation procedure, as is well known in the art. For example, if the computer program product 80 is a CD-ROM including instructions for the ordering application 42, the customer can install an ordering application 42 from the CD-ROM computer program product 80 to the customer computer 22 by using a CD-ROM reader on the customer computer 22.

The software instructions for the applications 42, 44, 46 can be downloaded over a wireless connection, in one embodiment. A computer program propagated signal product 82 embodied on a propagated signal on a propagation medium (e.g. a radio wave, an infrared wave, a laser wave, sound wave, or an electrical wave propagated over the Internet or other network) provides software instructions for one or more of the software applications 42, 44, 46. In alternate versions, the propagated signal is an analog carrier wave or a digital signal carried on the propagated medium. For example, the propagated signal can be a digital signal propagated over the Internet or other network. In one embodiment, the propagated signal is a signal that is transmitted over the propagation medium over a period of time, such as the instructions for a software application sent in packets over a network over a period of seconds, minutes, or longer.

For example, if the computer program propagated signal product 82 is available over the Internet at a Web site including instructions for the ordering application 42, the customer can install an ordering application 42 from the Web site by logging on to the Web site and requesting a download of the ordering application 42 over the network to a storage medium on the customer computer 22. The customer can then install the ordering application 42 from the storage medium onto the customer computer 22 using suitable software installation programs and procedures, as is known in the art.

Figure 3:
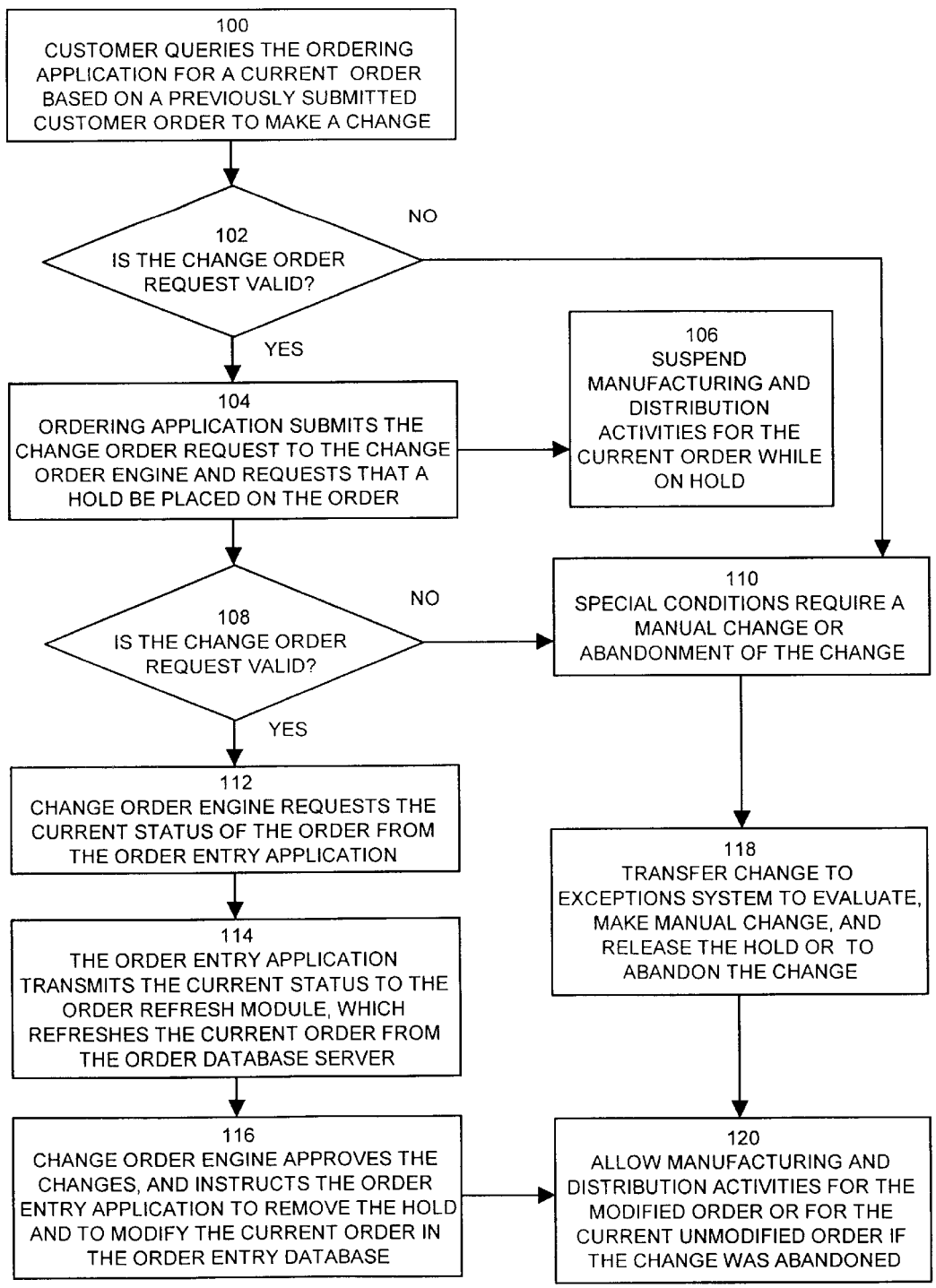
FIG. 3 shows, by way of example only, a flow chart for a procedure for processing a change order request for the system shown in FIG. 2.

FIG. 3 shows, by way of example only, a flow chart for a procedure for processing a change order request for the embodiment of the invention shown in FIG. 2. First, in step 100, the customer queries the ordering application 42 for a current order based on a previously submitted order. The current order is one that the customer has authority to change and is one that the customer previously submitted or was submitted by some other means on the customer's behalf. For example, the customer may have spoken with a sales representative over the phone who then submitted the current order based on the phone conversation. Alternatively, the customer works in an organization and someone else in the organization submitted the current order. In the beginning, the customer is querying the current order to obtain information on it, and then makes a request for changes to the current order based on the customer's current knowledge of it. Typically, the customer sits a computer 22 and accesses an ordering application 42 that displays the current order on a graphical user interface (GUI) that is displayed on a visual display associated with the customer computer 22. The customer then enters the changes to the order into the GUI to be processed by the ordering application 42. For example, for a hardware product such as a router, the changes can include changes to the quantity of the order, or selected items in the order, the ship date, the amount of memory, the number of ports, and other features of the ordered product.

In step 102, the initial evaluator 60 in the ordering application 42, evaluates the change order request entered by the customer. First the initial evaluator 60 determines whether the customer is authorized to make the change order request, for example, based on the user identification (ID) and password entered by the customer, the bill-to ID, or by some other authorization technique, as is known in the art. Then the initial evaluator 60 evaluates the validity of the change order request. For example, the customer may not be allowed to change the values in certain fields in the GUI of the ordering application 42. In one embodiment, the initial evaluator 60 determines the validity of the change order request based on a set of security and business rules, by using a rules based or case-based analysis. For example, one business rule indicates that certain orders are not allowed to be modified based on the type of order, such multinational, trade-ins, and credit card orders. In one embodiment, the ordering application 42 provides a rules-based system (RBS) that allows business customers to defines customer-specific rules without programming. In one embodiment, the initial evaluator 60 only evaluates and validates fields that the customer has changed.

If the initial evaluator 60 determines that the change order request is not valid, then the change order request may require special handling (step 110). The ordering application 42 then forwards the change order request to the exceptions system 48 for special handling (step 118). A customer representative may need to evaluate the requested changes. The special conditions may require a communication between a customer representative and the customer, and/or the manual entry of the change order request by the customer representative in a manual order entry module 50.

In step 104, after the initial evaluator 60 determines that the change order request is valid (step 102), the ordering application 42 submits the change order request to the change order engine 44 and requests that a hold be placed on the current order in the order database 52. The manufacturing and distribution facility 56 suspends or does not begin activities manufacturing and distribution activities intended to fulfill the current order (step 106). Then, in step 108, the server evaluator 62 determines whether the change order request is valid by performing an additional validation step to the one already performed by the initial evaluator 60 in step 102. First, the server evaluator 62 determines whether the order is still open. Then the server evaluator 62 uses a set of business rules, as described generally for the initial evaluator 60 to determine if the change order request is valid. In one embodiment, in step 102 the initial evaluator 60 uses a subset of the business rules used by the server evaluator 62 in step 108 to determine the validity of the change order request.

In step 108, if the server evaluator 62 determines that the change order request is not valid, then the change order engine 44 transfers the change order request to the exceptions system 48 (steps 110 and 118 as described previously). However, if the server evaluator 62 determines that the change order request is valid, then the change order engine 44 requests the current status of the current order from the order entry application 46 (step 112). This is done only if the customer computer 22 has only a local copy of the order that does not reflect the current status of the order in the order database 52 in the order database server 28.

The order entry application 46 obtains the current status from the order entry tables 54 in the order database 52, and the order database server 28 transmits the current status to the order refresh module 58 on the customer computer 22 (step 114). The refresh module 58 refreshes the current order displayed to the customer by the ordering application 42 based on the current status received from the order database server 28. In one embodiment, the order database server 28 also transmits feedback information on adverse impacts of the proposed change request, such as loss of the original shipment date. The customer can then change the order based on the current status of the order and what is allowed to be changed in the order. The customer receives feedback on the actual changes made to the order. In one embodiment, feedback includes movement of lines across different shipsets (e.g. any changes in how ordered items are grouped for shipping and/or what address they will be shipped to), modification of shipset information at the order level, and the creation or addition of shipsets. The ordering application 42 ignores any intermediate delta changes made the customer during various steps of the change order process and determines the actual changes made by the customer to the order. The ordering application 42 includes a delta summary engine that determines the change by sending messages to the various components of the order and summarizing the responses received back. The ordering application 42 displays the resulting summary of the change order request to the customer. The customer then confirms that the change order request, and the ordering application 42 sends this confirmation to the change order engine 44.

In step 116, the change order engine 44 approves the changes, based on the confirmation from the customer, and instructs the order entry application 446 to remove the hold and to modify the current order in the order database 52. In step 120, the order database server 28 allows the manufacturing and distribution facility 56 to perform the appropriate manufacturing and/or distribution activities to fulfill the modified order. If the order is not to be modified, then the database server 28 removes the hold, and allows the current unmodified order to be available to be fulfilled by the manufacturing and distribution facility 56.

Figure 4:
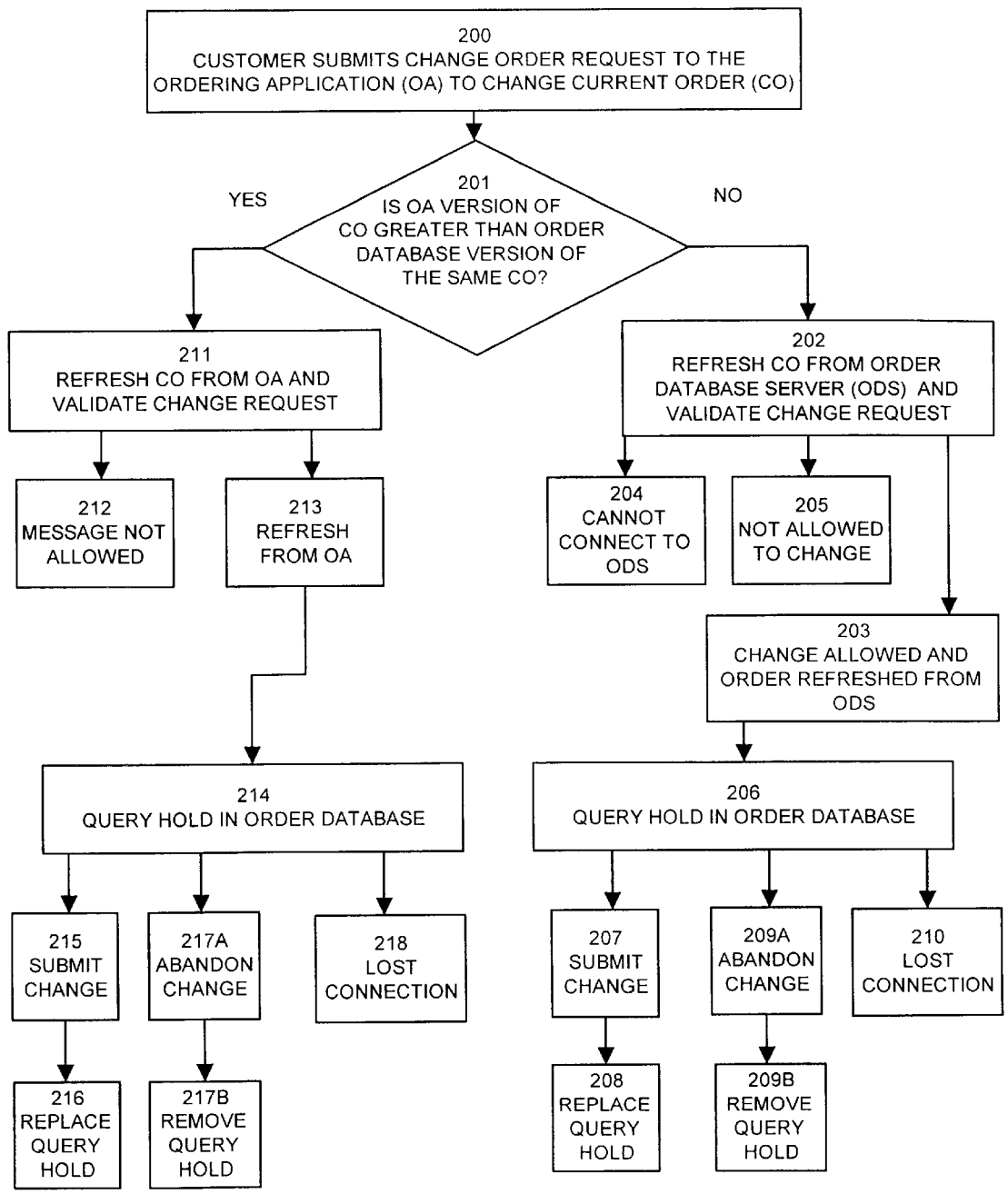
FIG. 4 shows a flow chart for the process of entering a change order request at a customer computer and refreshing the status of the current order for one embodiment of the invention.

FIG. 4 shows a flowchart for the process of entering a change order request at a customer computer 22 and refreshing the status of the current order for one embodiment of the invention. First, the customer submits the change order request to the ordering application 42 requesting a modification to the current order (step 200). The ordering application 42 determines whether to refresh the order displayed to the customer at the customer computer 22 from the order database 52 based on the order stored in the order entry tables or from the ordering application 42 based on a local copy of the order stored in the customer computer 22 (step 201). The ordering application 42 determines whether the ordering application version of the current order is greater that the version stored in the order database 52.

If the ordering application version of the current order is not greater than the order database version of the order, then the ordering application 42 refreshes the current order from the order database server 28 and validates the change request (step 202). The ordering application 46 makes a call to the change order engine 44 requesting the order refresh, and the change order engine 44 passes this request to the order database server 28. If the ordering application 46 cannot connect to the change order engine 44, then the ordering application 42 displays an appropriate message to the customer indicating the lack of connection. If the change order engine 44 cannot connect to the order database server 28, then the change order engine 44 returns an appropriate message indicating the lack of connection to the ordering application 42 to be displayed to the customer (step 204).

The change order engine 44 performs a validation. If the validation fails and the customer is not allowed to change the order, then an appropriate message indicating the failure of the validation is returned to the ordering application 42 to be displayed to the customer (step 205). If the validation is successful, the change is allowed, and the order database server 28 transmits the current status of the order to the ordering application 42 (step 203). The ordering application 42 updates the order ID, checks for success of the order refresh, and makes the copy of the order. The ordering application 42 makes a call to the change order engine 44 to put a query hold on the order in the order database server 28 (step 206). The change order engine 44 makes sure that the hold is applied and returns status to the ordering application 42. The ordering application 42 displays the refreshed order to the customer.

The customer then tries to make the desired changes to the order. The customer completes the changes and submits them to the ordering application 42. The ordering application 42 makes a call to the change order engine 44 to submit the change, and the change order engine 44 processes the request (step 207). The change order engine 44 replaces the query hold in the order database server 28 with a change hold (step 208). Alternatively, the customer decides to abandon the change explicitly (step 209A). The ordering application 42 then makes a call to the change order engine 44 to remove the query hold (step 209B). The change order engine 44 releases the hold in the order database server 28. If the ordering application 42 cannot connect to the change order engine 44, the change order engine cannot connect to the order database server 28, or a connection is lost then the ordering application 42 provides an appropriate message to the customer (step 210).

If the ordering application version of the current order is greater than the order database version of the same order, then the ordering application 42 validates and refreshes the order from the ordering application version of the current order (step 211). The ordering application 42 validates the order to determine if it is refreshable. If not, then the ordering application 42 displays an appropriate message to the customer (step 212). The ordering application 42 then refreshes the order from its own order tables stored locally on the customer computer 22 (step 213). The ordering application 42 makes a call to the change order engine 44 to apply a query hold on the order in the order database server 28 (step 214). The change order engine 44 applies the hold and returns the status to the ordering application 42. The ordering application 42 displays the order to the customer.

The customer then tries to make the desired changes to the order. The customer completes the changes and submits them to the ordering application 42. The ordering application 42 makes a call to the change order engine 44 to submit the change, and the change order engine 44 processes the request (step 215). The change order engine 44 replaces the query hold in the order database server 28 with a change hold (step 216). Alternatively, the customer decides to abandon the change explicitly (step 217A). The ordering application 42 makes a call to the change order engine 44 to remove the query hold (step 217B). The change order engine 44 releases the hold in the order database server 28. If the ordering application 42 cannot connect to the change order engine 44, the change order engine cannot connect to the order database server 28, or a connection is lost then the ordering application 42 provides an appropriate message to the customer (step 218).

Figure 5:
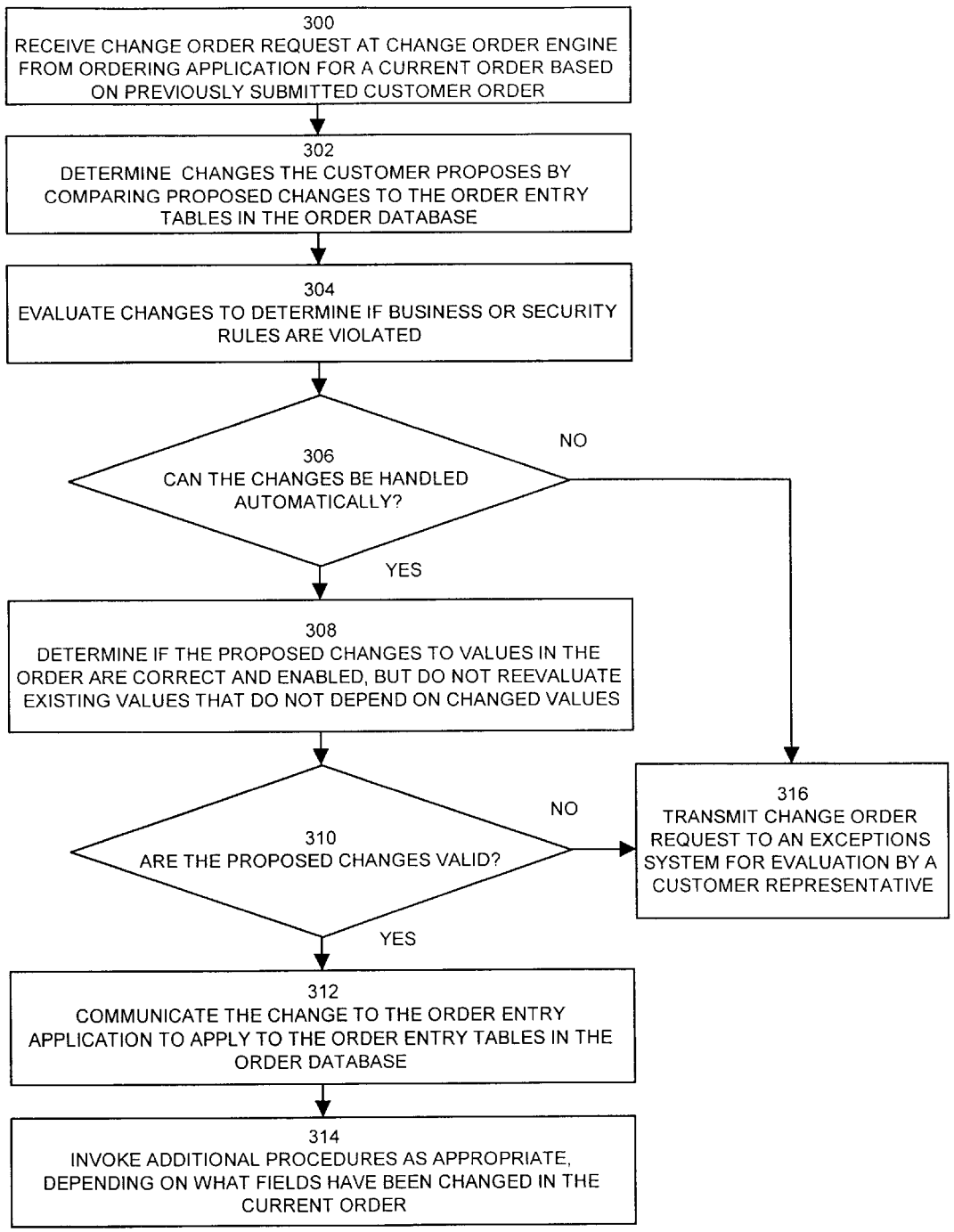
FIG. 5 shows a flow chart for the process of handling the change order request after it has been received by the change order engine for one embodiment of the invention.

FIG. 5 shows a flow chart for the process of handling the change order request after it has been received by the change order engine for one embodiment of the invention. First the change order engine 44 receives the change order request from the ordering application 42 for a current order based on a previously submitted customer order (step 300). In one embodiment, the change order engine 44 includes change order manager, change order worker, and change order janitor modules, which are applications, applets, scripts, routines, or other software program running as part of or under the direction of the change order engine 44. The change order manager runs continuously to check if any change order requests have been submitted. If an order has been submitted the change order worker is launched to process the change order request. The change order engine 44 can run more than one change order worker at one time. The change order worker is able to handle any unusual scenarios, such as multiple change requests for a single order and changes to orders that have not yet been imported into the order database server 28.

The change order worker determines what changes the customer proposes by comparing the proposed changes to the order entry tables 54 in the order database 52 (step 302). The change order worker receives a complete picture of the order as it was submitted in the ordering application 42. The change order worker compares this order picture on a table-by-table and column-by-column basis to the current order data for the order in the order entry tales 54. The change order worker logs the identified changes in a temporary table. In one embodiment, the change order worker performs the comparison process of step 302 by first retrieving the last order submitted by the customer. Then the change order worker compares all attributes in an iterative process of scanning each object (e.g. piece of data) in the order until all objects are scanned. The change order worker also bases the comparison on the movement of any shipsets across lines. The change order worker then generates a summary of the changes.

The change order engine 44 then evaluates the proposed changes to determine if business or security rules are violated (step 304). Certain changes are allowed in the ordering application 42 but may require additional approvals before being applied in the order entry application 46. The change order engine 44 also rechecks the security rules. The change order engine 44 reads the latest order cycle status from the order entry application 46 to make sure the changes are allowed. Although the ordering application also checks the security rules, the change order engine 44 revalidates the security rules to double check them. The change order engine 44 thus determines whether the changes are ones that can be handled automatically (step 306). If the changes cannot be handled automatically, then the change order engine 44 transmits the change order request to the exceptions system 48 for evaluation by a customer representative (step 316).

The change order engine 44 also determines if the proposed changes to values in the order are correct and enabled, but does not reevaluate existing values in the order that do not depend on the changed values (step 308). For example, suppose that the freight carrier is changed, then the new value for the freight carrier must be valid and enabled. In one embodiment, the change order engine 44 uses custom business rules developed for a particular company. The goal of this validation step is make sure the order changes undergo the same validation rules and error checking that would be enforced if the same changes were entered directly into the order entry application 46. The change order engine 44 uses many of the same validation routines used to validate a new order. The change order engine 44 only validates those fields that have actually changed. For example, the customer changes the order's purchase order number but not the freight carrier. The freight carrier chosen by the customer was enabled at the time of the original order entry, but is now no longer enabled for any new orders. However, since the customer did not change the freight carrier, the change order engine 44 does validate the freight carrier field in the changed order. This approach is similar to the one followed for change orders entered directly into the order entry application 46.

If the proposed changes are not valid (step 310), then the change order engine 44 transmits the change order request to an exceptions system 48 for evaluation by a customer representative (step 316).

If the proposed changes are valid (step 310), the change order engine 44 then communicates the changes to the order entry application 46 to apply the changes to the order entry tables 54 in the order database 52 (step 312). The order entry application 46 uses an order import module to import the changes to the order. The order entry application 46 may have to update underlying control columns as well as the customer visible fields of the order when applying the changes to the order entry tables 54. In one embodiment, the change order engine 44 then uses electronic mail to send a summary of the changes to a customer service documentation system for entry into that system and automated processing by that system.

Finally, the change order engine 44 invokes any additional procedures that need to be invoked as appropriate depending on what fields have been changed in the current order (step 314). For example, changes to the quantity of ordered items in the change order request may require that the change order engine 44 call credit check and configuration packages. The change order janitor module functions to release expired holds and resubmits failed or incomplete transactions. After the change order engine 44 processes the change request, and the change is entered automatically or through the exceptions system 48, a notification is generated and sent back to the customer via fax or electronic mail. The customer thus knows that the order has been changed.

The change order system 40, as described by way of example for FIG. 5, has several special features. One is that the ordering application 42 stores historical data on customer and product data rather than only maintain current data. Another feature is that the change order system 40 must properly handle option classes. Option classes are placeholders that are stored in lines in the order database 52 that represent the category to which a chose option belongs. Because the option classes do not represent physical items, the ordering application 42 does not display options classes to the customer. The ordering application 42 must properly filter out option classes when displaying the order data to the customer. The order entry application 48 must also properly update option classes when the customer has added or deleted options. An additional feature is that the change order worker writes a large amount of output to a concurrent request log file to facilitate error handling and investigation.

One implementation of the change order system 40 is the Internet Commerce Architecture of Cisco Systems, Inc. of San Jose, Calif. In one embodiment, the ordering application 42 is implemented in Java, and the change order engine is implemented in Pro*C and PL/SQL.

Figure 6:
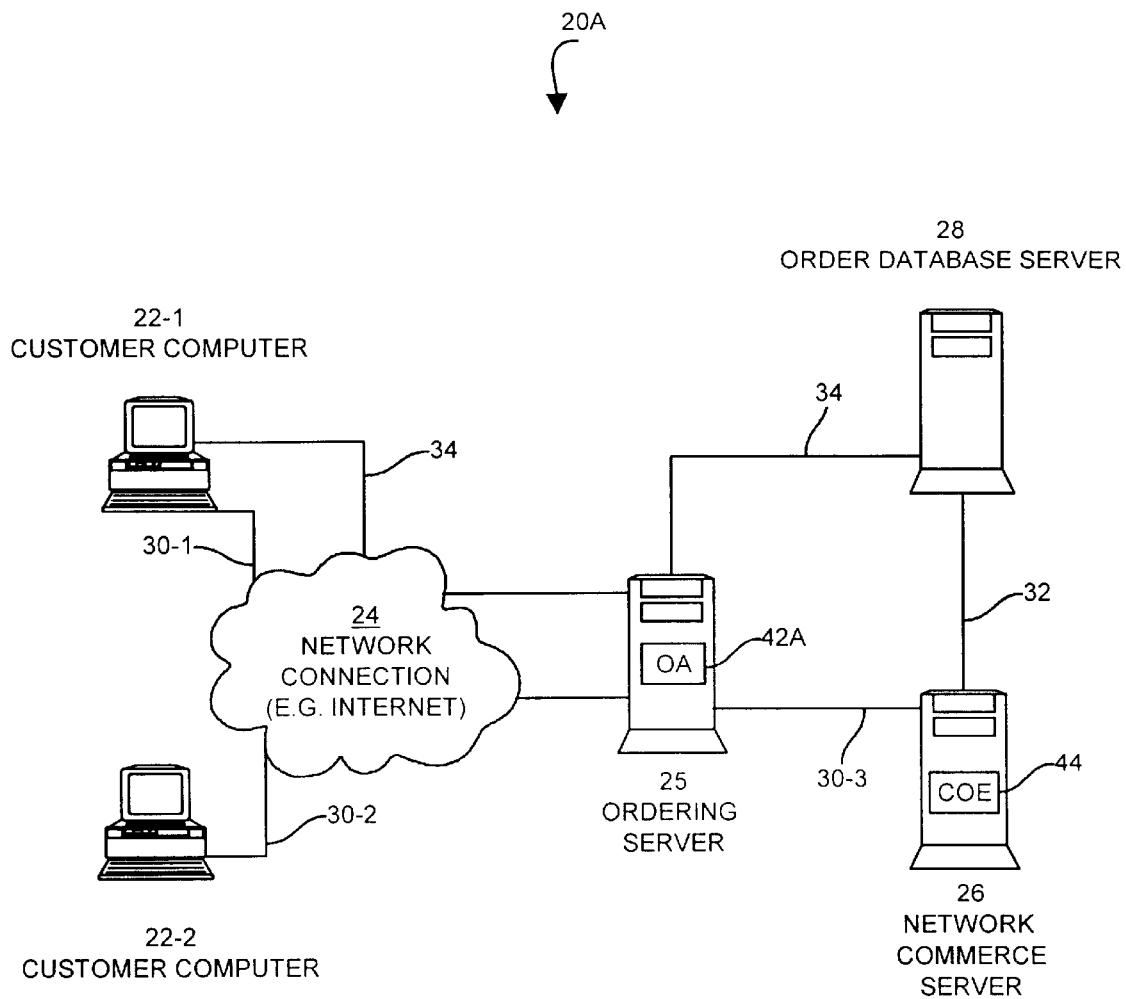
FIG. 6 shows a pictorial view of another embodiment of the change order system shown in FIG. 1, further including an ordering server and an ordering application.
Figure 7:
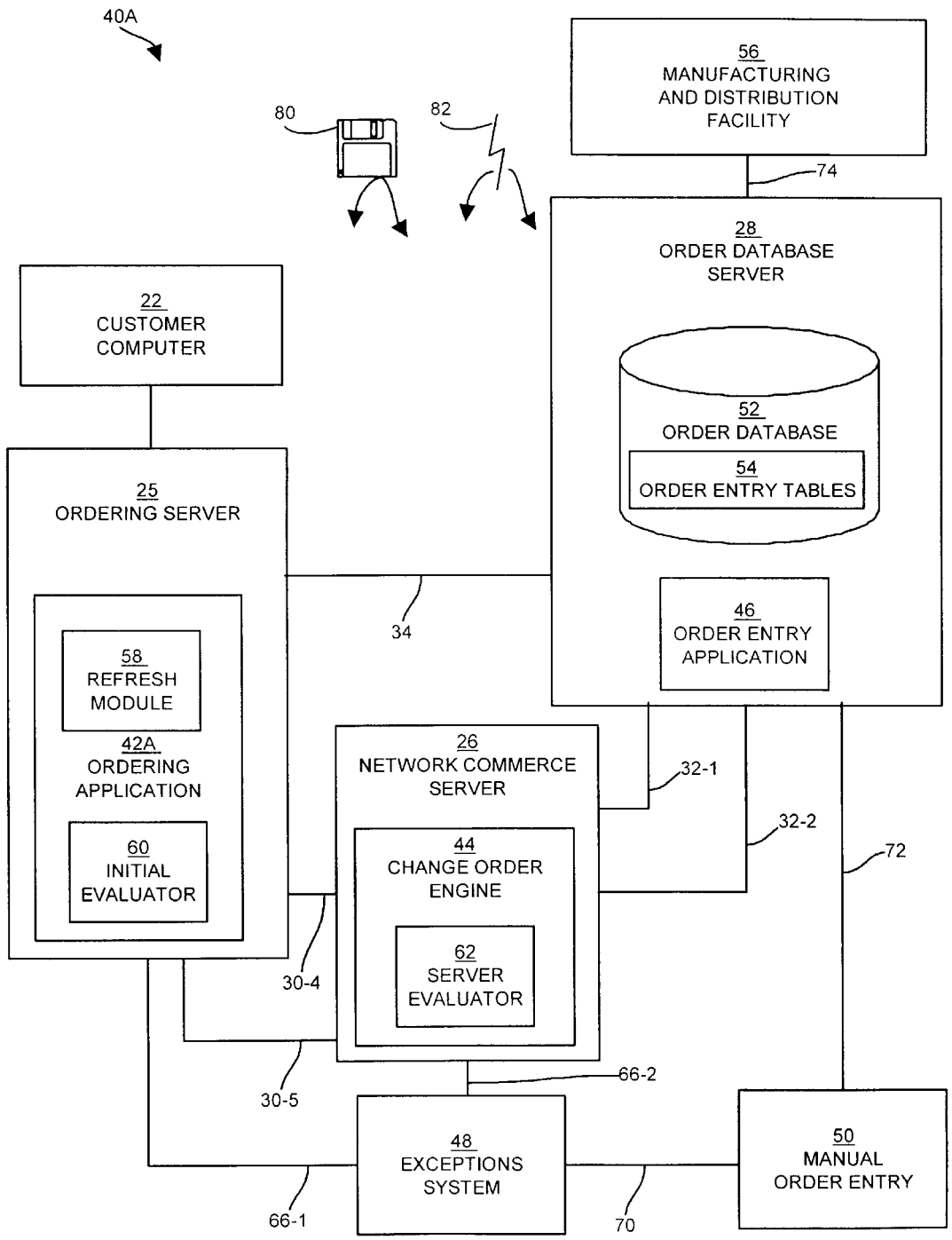
FIG. 7 shows another embodiment of the block diagram shown in FIG. 2, further including an ordering server and a customer computer.

FIG. 6 illustrates a change order system 20A that is similar to the change order system 20 illustrated in FIG. 1. However the change order system 20A of FIG. 6 further includes an ordering server 25, which includes an ordering application 42A. FIG. 7 illustrates a change order system 40A that is similar to the change order system 40 illustrated in FIG. 2. However, the change order system 40A of FIG. 7 further includes an ordering server 25 including an ordering application 42A, which includes a refresh module 56 and an initial evaluator 60. The ordering server 25 is a server computer, including a processor, a memory, and communication hardware that enables communication over the network connection 24 or other connections to the customer computer 22, order database server 28, and the network commerce server 26. The ordering application 42A is another embodiment of the ordering application 42 of FIG. 2, and provides generally the same functionality to the customer as provided by an ordering application 42 residing on the customer computer 22. When using the ordering application 42A shown in FIG. 7, the customer accesses the ordering application 42A over a network or other connection from the customer computer 22 to the ordering application 42A by using, in one embodiment, a web browser that accesses web pages prepared by the ordering application 42A. In other embodiments, the customer accesses the ordering application 42A by using other mechanisms, such as by using an applet or other software tool downloaded from the ordering server 25 to the customer computer 22. The customer can then use the ordering application 42A, as described in FIG. 3 and elsewhere herein, to perform the same functionality as the ordering application 42 of FIG. 2, including, but not limited to, querying a previously existing order, submitting a change order request for the current order, requesting an update of the status of the current order, confirming the change order request, and performing other functions.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the software applications and modules discussed herein can be implemented in various programming languages as instructions executed by one or more processors on one or more computer systems performed under the direction of the software applications and/or modules. In addition, it should be understood that the applications and/or modules can also be implemented as hardware circuits. The applications and/or modules can be implemented on one or more integrated circuits (IC), such as one or more ASIC's (application-specific integrated circuits), PLA's (programmable logic arrays), or FPGA's (field programmable gate arrays).

It should also be understood that the evaluation and validation functions of the change order system 40 are not required to be implemented on both the customer computer 22 and the network commerce server 26 but can be implemented only on one of them. The evaluation and validations functions can also be implemented as a separate software module on a separate computer system from the customer computer 22 or the network commerce server 26.

Furthermore, it should be understood that the change order system 40 can be implemented as a standalone system or combined with a new order system so that the change order system 40 is a general ordering system handling both new and changed orders. The ordering application 42 can present the customer with two interfaces, a change order interface and a new order interface in the GUI, even if the system 40 as a whole handles both new and changed orders in one system.

What is claimed is:

1. A method for changing, over a network, a current order based on a previously submitted customer order, comprising the steps of:

receiving a change order request;

placing a hold on the current order to suspend manufacturing activities to fulfill the current order in response to the step of receiving the change order request;

providing a current order status in response to the step of receiving the change order request;

receiving a confirmation of the change order request in response to the step of providing the current order status;

modifying the current order based on the change order request to provide a modified order; and releasing the hold to enable fulfilling of the modified order.

2. The method of claim 1, further comprising the steps of applying at least one additional change order request to the modified order to provide a plurality of versions of modified orders and maintaining the plurality of versions of modified orders.

3. The method of claim 1, further comprising the steps of providing feedback that indicates changes to the current order and allowing modification to the change order request based on the feedback before confirming the change order request.

4. The method of claim 3, wherein the step of providing feedback comprises providing feedback of an adverse impact relating to the change order request.

5. The method of claim 1, further comprising the step of evaluating a validity of the change order request.

6. The method of claim 1, further comprising the step of providing a completion signal that indicates the completion of the step of modifying the current order based on the change order request.

7. A system for changing, over a network, a current order based on a previously submitted customer order, comprising:

a customer computer comprising an ordering application capable of generating a change order request;

a network commerce server in electrical communication over the network with the customer computer, the network commerce server comprising a change order engine; and an order database server in electrical communication over the network with the customer computer and the network commerce server, the order database server comprising an order database and an order entry application that is capable of accessing and updating the order database;

wherein (i) the ordering application generates a change order request and submits the change order request over the network to the change order engine, (ii) the change order engine requests the order entry application to place a hold on the current order status to suspend manufacturing activities to fulfill the current order and to provide a current order status to the ordering application, (iii) the ordering application provides confirmation of the change order request to the change order engine, and (iv) the change order engine instructs the order entry application to modify the current order in the order database based on the change order request to provide a modified order and to release the hold so that the modified order is capable of being fulfilled.

8. The system of claim 7, wherein the ordering application provides at least one additional change order request to the change order engine to provide a plurality of versions of modified orders and the order entry application maintains the plurality of versions of modified orders.

9. The system of claim 7, wherein the order entry application provides feedback indicating changes to the current order to the ordering application, and the ordering application allows modification to the change order request and provides the modified change order request to the change order engine.

10. The system of claim 9, wherein the order entry application, when providing feedback, provides feedback of an adverse impact relating to the change order request.

11. The system of claim 7, wherein the change order engine evaluates the validity of the change order request.

12. The system of claim 7, wherein the order entry application provides a completion signal to the ordering application that indicates that the order entry application has applied the change order request to the order database.

13. An apparatus for changing, over a network, a current order based on a previously submitted customer order, comprising:
   a network commerce server comprising a change order engine that receives a change order request over the network; and
   an order database server in electrical communication with the network commerce server over the network, the order database server comprising an order database and an order entry application that is capable of accessing and updating the order database;
   wherein
      (i) the change order engine places a hold on the current order to suspend manufacturing activities to fulfill the current order and requests the order entry application to determine a current order status of the current order and to provide the current order status over the network;
      (ii) the change order engine receives a confirmation of the change order over the network, and the change order engine submits the change order request to the order entry application to modify the current order in the order database to provide a modified order; and
      (iii) the change order engine removes the hold to enable fulfilling the modified order.

14. The apparatus of claim 13, further comprising an exceptions module that is capable of handling exceptional situations requiring special handling of the change order request, wherein the change order engine determines that the change order request requires special handling, provides the change order request to the exceptions module, and the exceptions module provides the change order request to the order entry application for entry into the order database.

15. The apparatus of claim 13, the change order engine further comprising an evaluator that evaluates the validity of the change order request.

16. The apparatus of claim 13, wherein the change order engine receives a modification to the change order request over the network after providing the current order status over the network.

17. The apparatus of claim 16, wherein the change order engine further provides feedback of an adverse impact relating to the change order request.

18. An apparatus comprising a customer computer for submitting, over a network, a change order request to a current order based on a previously submitted customer order, comprising:
   an ordering application executing on the customer computer that displays an order status on a customer computer and is capable of receiving input from a customer; and
   a refresh module executing on the customer computer capable of refreshing the order status,
   wherein
      (i) the ordering application places a hold on the current order to suspend manufacturing activities to fulfill the current order in response to the input of the change order request,
      (ii) the refresh module refreshes the order status in response to the input of the change order request by the customer, and
      (iii) the ordering application confirms the change order request and submits the change order request over the network.

19. The apparatus of claim 18, wherein the refresh module receives feedback over the network that indicates changes to the current order, and the ordering application displays the feedback on the customer computer and allows modification to the change order request based on the feedback before submitting the change order request over the network.

20. The apparatus of claim 19, wherein, when receiving feedback, the refresh module receives feedback of an adverse impact relating to the change order request.

21. The apparatus of claim 18, further comprising an evaluator, wherein the evaluator evaluates a validity of the change order request.

22. A method for submitting, over a network, a change order request to a current order based on a previously submitted customer order, comprising the steps of:
   receiving the change order request;
   transmitting the change order request over the network in response to the step of receiving the change order request;
   requesting a hold on the current order to suspend manufacturing activities to fulfill the current order in response to the step of receiving the change order request;
   receiving a current order status over the network in response to the step of transmitting the change order request;
   providing a confirmation of the change order request in response to the step of receiving the current order status;
   transmitting the confirmation of the change order request over the network; and
   receiving a completion signal over the network indicating that the current order has been modified.

23. The method of claim 22, wherein the step of receiving current order status comprises receiving feedback of an adverse impact relating to the change order request and wherein the step of providing confirmation comprises the step of providing confirmation of the change order request in response to the step of receiving the feedback.

24. A computer program product that includes a computer readable medium having instructions stored thereon for changing a current order over a network based on a previously submitted customer order, such that the instructions, when carried out by a computer, cause the computer to perform the steps of:
   receiving the change order request;
   transmitting the change order request over the network in response to the step of receiving the change order request;
   requesting a hold on the current order to suspend manufacturing activities to fulfill the current order in response to the step of receiving the change order request;
   receiving a current order status over the network in response to the step of transmitting the change order request;
   providing a confirmation of the change order request in response to the step of receiving the current order status;
   transmitting the confirmation of the change order request over the network; and
   receiving a completion signal over the network indicating that the current order has been modified.

25. The computer program product of claim 24, wherein the step of receiving a current order status comprises receiving feedback of an adverse impact relating to the change order request and wherein the step of providing a confirmation comprises the step of providing a confirmation of the change order request in response to the step of receiving the feedback.

26. A computer program propagated signal product embodied in a propagated medium, having instructions for changing a current order over a network based on a previously submitted customer order, such that the instructions, when carried out by a computer, cause the computer to perform the steps of:

receiving the change order request;

transmitting the change order request over the network in response to the step of receiving the change order request;

requesting a hold on the current order to suspend manufacturing activities to fulfill the current order in response to the step of receiving the change order request;

receiving a current order status over the network in response to the step of transmitting the change order request;

providing a confirmation of the change order request in response to the step of receiving the current order status;

transmitting the confirmation of the change order request over the network; and receiving a completion signal over the network indicating that the current order has been modified.

27. The computer program propagated signal of claim 26, wherein the step of receiving a current order status comprises receiving feedback of an adverse impact relating to the change order request and wherein the step of providing a confirmation comprises the step of providing a confirmation of the change order request in response to the step of receiving the feedback.

28. An apparatus for changing, over a network, a current order based on a previously submitted customer order, comprising:

a network commerce server comprising a change order engine that receives a change order request over the network; and an order database server in electrical communication with the network commerce server over the network, the order database server comprising an order database and an order entry application that is capable of accessing and updating the order database;

wherein the change order engine comprises:
(i) means for placing a hold on the current order to suspend manufacturing activities to fulfill the current order and requesting the order entry application to determine a current order status of the current order and to provide the current order status over the network;
(ii) means for receiving a confirmation of the change order over the network and submitting the change order request to the order entry application to modify the current order in the order database to provide a modified order; and
(iii) means for removing the hold to enable fulfilling the modified order.

29. The apparatus of claim 28, wherein the means for requesting further comprises a means for requesting the order entry application to determine feedback of an adverse impact relating to the change order request and provide the feedback over the network.

30. A computer program product that includes a computer readable medium having instructions stored thereon for changing a current order over a network based on a previously submitted customer order, such that the instructions, when carried out by a computer, cause the computer to perform the steps of:

receiving a change order request;

placing a hold on the current order to suspend manufacturing activities to fulfill the current order in response to the step of receiving the change order request;

providing a current order status in response to the step of receiving the change order request;

receiving a confirmation of the change order request in response to the step of providing the current order status;

modifying the current order based on the change order request to provide a modified order; and releasing the hold to enable fulfilling of the modified order.

31. The computer program product of claim 30, wherein the step of providing further comprises providing feedback of an adverse impact relating to the change order request and wherein the step of receiving confirmation further comprises receiving confirmation of the change order request in response to the step of providing feedback.

32. An apparatus comprising an ordering server for submitting, over a network, a change order request to a current order based on a previously submitted customer order, the ordering server comprising:

an ordering application executing on the ordering server that provides an order status over the network and is capable of receiving over the network input specifying a change order request; and a refresh module executing on the ordering server that is capable of refreshing the order status, wherein
(i) the ordering application places a hold on the current order to suspend manufacturing activities to fulfill the current order in response to the input of the change order request,
(ii) the refresh module refreshes the order status in response to the input of the change order request, and
(iii) the ordering application confirms the change order request and submits the change order request over the network.

33. The apparatus of claim 32, wherein the refresh module receives feedback over the network that indicates changes to the current order, and the ordering application provides the feedback over the network and allows modification to the change order request based on the feedback before submitting the change order request over the network.

34. The apparatus of claim 33, wherein when receiving feedback, the refresh module receives feedback of an adverse impact relating to the change order request.

35. The apparatus of claim 32, further comprising an evaluator, wherein the evaluator evaluates a validity of the change order request.

* * * * *